(12) United States Patent
Chelian

(10) Patent No.: US 10,919,522 B2
(45) Date of Patent: Feb. 16, 2021

(54) AUTOMATED EXPLOITATION OF SHADE-GIVING STRUCTURES

(71) Applicant: FUJITSU LIMITED, Kawasaki (JP)

(72) Inventor: Suhas Chelian, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 233 days.

(21) Appl. No.: 16/007,925

(22) Filed: Jun. 13, 2018

(65) Prior Publication Data

US 2019/0382001 A1   Dec. 19, 2019

(51) Int. Cl.
*G07C 5/08*   (2006.01)
*B60W 30/06*   (2006.01)
*G05D 1/00*   (2006.01)

(52) U.S. Cl.
CPC ........... *B60W 30/06* (2013.01); *G05D 1/0088* (2013.01); *B60W 2555/20* (2020.02)

(58) Field of Classification Search
CPC ............ B60W 30/06; B60W 2555/20; B60W 2555/00; G05D 1/0088; G08G 1/14; G08G 1/141; G08G 1/145; G08G 1/149; G08G 1/147; G08G 1/148
USPC ..................... 701/22, 23, 439, 532
See application file for complete search history.

(56) References Cited

U.S. PATENT DOCUMENTS

| | | | | |
|---|---|---|---|---|
| 8,884,784 | B2 * | 11/2014 | Kirsch | G08G 1/143 340/932.2 |
| 9,976,869 | B2 * | 5/2018 | Akselrod | G01C 21/3691 |
| 10,436,152 | B2 * | 10/2019 | Dudar | F02M 25/089 |
| 2006/0250278 | A1 * | 11/2006 | Tillotson | G08G 1/14 340/932.2 |
| 2010/0169008 | A1 * | 7/2010 | Niwa | B60L 3/12 701/532 |

(Continued)

FOREIGN PATENT DOCUMENTS

DE   102015200492 A1 *  1/2015  ............ B60W 40/02

OTHER PUBLICATIONS

Forbes Technology Council. (Aug. 18, 2017) "10 Features Consumers Will Want to Watch Out for in Driverless Cars." Forbes.com. Retrieved From: https://www.forbes.com/sites/forbestechcouncil/2017/08/18/10-features-consumers-will-want-to-watch-out-for-in-driverless-cars/#3611e6243b2a.

(Continued)

*Primary Examiner* — Richard A Goldman
(74) *Attorney, Agent, or Firm* — Maschoff Brennan

(57) ABSTRACT

In the present disclosure, operations may include obtaining a parking area constraint, a time constraint, and one or more mobile machine parameters. The operations may include determining a first parking position within the parking area during the time period. The operations may include identifying one or more shade-providing objects. The operations may include determining, based on the one or more shade-providing objects, one or more shadow profiles. The operations may include determining, based on the time constraint, the parking area constraint, and the one or more shadow profiles, a first shadow-position relationship that indicates shade provided at the first parking position during the time period. In addition, the operations may include selecting the first parking position based on the first shadow-position relationship and the one or more mobile machine parameters. The operations may further include, in response to the selecting, causing the mobile machine to park at the first parking position.

17 Claims, 6 Drawing Sheets

(56) References Cited

U.S. PATENT DOCUMENTS

| | | | |
|---|---|---|---|
| 2013/0285841 A1* | 10/2013 | Kirsch | G08G 1/143 340/932.2 |
| 2014/0316630 A1* | 10/2014 | Kohlberger | B60L 1/08 701/22 |
| 2017/0046957 A1* | 2/2017 | Jordens | G08G 1/143 |
| 2017/0124873 A1* | 5/2017 | Semsey | B60H 1/00985 |
| 2017/0329346 A1* | 11/2017 | Latotzki | B60W 30/06 |
| 2019/0031199 A1* | 1/2019 | Dudar | B60W 50/0098 |
| 2019/0065027 A1* | 2/2019 | Hauenstein | G06F 3/014 |
| 2019/0333385 A1* | 10/2019 | Wisbrun | G08G 1/144 |
| 2019/0382001 A1* | 12/2019 | Chelian | G05D 1/0088 |
| 2020/0070676 A1* | 3/2020 | Miller | B60L 53/00 |

OTHER PUBLICATIONS

Michelle Etheridge. (Aug. 14, 2017) "Flinders University to introduce driverless, solar-powered bus to ferry passengers at Tonsley. Messenger Community News." Retrieved From: http://www.adelaidenow.com.au/messenger/west-beaches/flinders-university-to-introduce-driverless-solarpowered-bus-to-ferry-passengers-at-tonsley/news-story/53b518cca3870df9a6abdde2e40466cb.

J. A. Duffie and W. E. Beckman, "Solar Engineering of Thermal Processes", Wiley, New York, Jun. 1980.

Passias, D., & Källbäck, B. (Apr. 1984). "Shading effects in rows of solar cell panels. Solar Cells", 11(3), 281-291.

KaewTraKulPong, P., & Bowden, R. (May 2002). "An improved adaptive background mixture model for real-time tracking with shadow detection". Video-based surveillance systems, 1, 135-144.

\* cited by examiner

AUTOMATED EXPLOITATION OF SHADE-GIVING STRUCTURES

FIELD

The embodiments discussed in the present disclosure are related to automated exploitation of shade-giving structures.

BACKGROUND

External environment conditions, (e.g., weather conditions, a geographic location, objects in the external environment, etc.) may affect the amount of sunlight that irradiates mobile machines. The amount of sunlight that irradiates the mobile machines may affect different parameters (e.g., temperature, solar panel electrical output, battery charge as provided by electrical output of the solar panel, etc.) of the mobile machines.

The subject matter claimed in the present disclosure is not limited to embodiments that solve any disadvantages or that operate only in environments such as those described above. Rather, this background is only provided to illustrate one example technology area where some embodiments described herein may be practiced.

SUMMARY

According to one or more aspects of the present disclosure, operations related to generation of selectable parking positions are disclosed. In some embodiments, the operations may include obtaining a parking area constraint that delineates a parking area within which a mobile machine is designated to park, obtaining a time constraint that delineates a time period that the mobile machine is designated to park in the parking area, and obtaining one or more mobile machine parameters for the mobile machine in which the one or more mobile machine parameters are affected by an amount of sunlight that irradiates the mobile machine. The operations may also include determining, based on the parking area constraint and the time constraint, a first parking position within the parking area during the time period and a second parking position within the parking area during the time period. In addition, the operations may include identifying, based on the parking area constraint, one or more shade-providing objects that provide shade within the parking area.

The operations may also include determining, based on the one or more shade-providing objects, one or more shadow profiles in which each shadow profile is for a respective shadow created by a respective one of the one or more shade-providing objects during the time period. Further, the operations may include determining, based on the time constraint, the parking area constraint, and the one or more shadow profiles, a first shadow-position relationship that indicates shade provided at the first parking position during the time period and a second shadow-position relationship that indicates shade provided at the second parking position during the time period. In addition, the operations may include selecting the first parking position instead of the second parking position based on the first shadow-position relationship, the second shadow-position relationship, and the one or more mobile machine parameters. The operations may also include, in response to the selecting, causing the mobile machine to park at the first parking position.

BRIEF DESCRIPTION OF THE DRAWINGS

Example embodiments will be described and explained with additional specificity and detail through the use of the accompanying drawings in which.

DESCRIPTION OF EMBODIMENTS

Figure 1A:
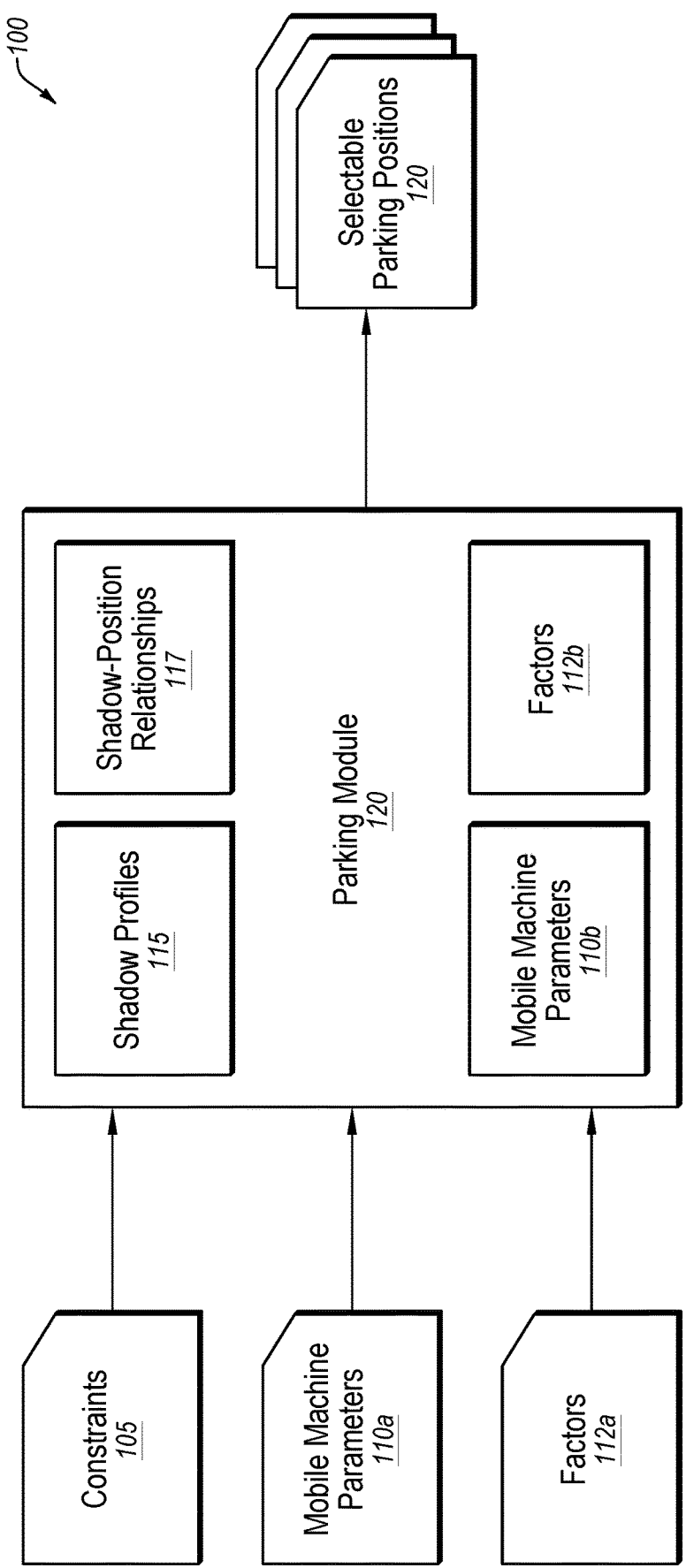
FIG. 1A illustrates an example environment configured to determine selectable parking positions based on one or more of constraints, mobile machine parameters, shadow profiles, factors, and shadow-position relationships.

An amount of sunlight that irradiates a mobile machine ("irradiating sunlight") may affect different parameters of the mobile machine. For example, the amount of irradiating sunlight may affect parameters of the mobile machine such as temperature and electrical output of solar panels ("solar panel output") of the mobile machine. The solar panel output may, in turn, affect a battery charge rate, a battery charge level, etc. of a battery system of the mobile machine such that the amount of irradiating sunlight may also affect one or more factors associated with the battery system of the mobile machine. The amount of irradiating sunlight at a particular location may be affected by a position of the sun with respect to shade-providing objects that may at least partially block the sunlight (i.e., cast a shadow) that may irradiate the particular location.

According to one or more embodiments of the present disclosure, a determination as to where to park a mobile machine may be made based on an amount of sunlight that may irradiate the mobile machine at a particular location. The amount of irradiating sunlight may help the mobile machine achieve target parameters. For instance, parking the mobile machine in the shade (e.g., blocking some irradiant sunlight) may help achieve a target temperature. The target temperature may correspond to a component temperature of a component of the mobile machine or an ambient air temperature of an interior of the mobile machine. Additionally or alternatively, parking the mobile machine in the sunlight (e.g., outside of the shade) may help the mobile machine achieve the same or other target parameters such as a target solar panel output. The target solar panel output may help a battery system of the mobile machine achieve, for example, a target battery charge rate or a target battery charge level.

In the present disclosure, reference to "mobile machine," may refer to any device or machine that is movable from a first geographic position (e.g., "Point A") to a second geographic position (e.g., "Point B"). In these or other embodiments, the mobile machines may be autonomous or semi-autonomous with respect to moving between geographic positions. Alternatively, the mobile machines may be human-operated between geographic positions. Examples of mobile machines may include robots, drones, self-driving cars, human-operated cars, equipment (e.g., construction/maintenance equipment such as a backhoe, a street-sweeper, a steam roller, etc.), storage pods (e.g., a transportable storage unit, etc.), or any other suitable devices configured to move between geographic positions.

Additionally, a "parking area" may correspond to any spatial area of a given geographic position, on the ground or in-air, which is designated for parking the mobile machine. Examples of parking areas may include a parking station, a parking hangar, a parking lot, a parking terminal, a charging station, a gas station, a maintenance bay, a weigh station, a port of entry, a return location, a storage location, a rest station, a rest area, a rest stop, a standby mode station, a waiting station, a hover station, a loading dock, or any other suitable position for parking the mobile machine. A "parking position" may correspond to a particular spatial area of a given geographic position, on the ground or in-air, which is within the parking area and is designated for parking the mobile machine. Examples of parking positions may include a parking space, a parking stall, a parking spot, a parking unit, a resting position, a charging position, a standby position, etc.

In these or other embodiments, "parking" of the mobile machine may correspond to placement of the mobile machine at a given geographic position in which the mobile machine may remain at the geographic position for a period of time, such as the parking position described above. The placement of the mobile machine at the parking position may be permanent. Additionally or alternatively in many cases, the placement may be temporary in which the period of time during which the mobile machine may remain at a particular parking position may vary. For example, the mobile machine may be placed at the particular parking position for a period of time, such as several minutes, hours, days, or weeks. In other instances, the placement of the mobile machine at the parking position may be for a longer period of time, such as months, years, or decades. Additionally, the placement of the mobile machine at the parking position may correspond to the mobile machine being fully stationary at the parking position (i.e., completely static). For example, the mobile machine may be powered off and/or placed in a mode not permitting movement of the mobile machine while placed in the parking position (e.g., putting a transmission gear into a "park" gear, locking a steering mechanism, engaging a sleep mode, etc.). In other instances, the placement of the mobile machine at the parking position may correspond to the mobile machine being semi-stationary (i.e., not completely static across a time duration). For example, the mobile machine may remain on and/or placed in a mode permitting some movement of the mobile machine when placed within the parking position (e.g., engaging a standby mode, hovering in place or hovering within the confines of the parking position, moving within the confines of the parking position to charge or connect to/disconnect from a charging mechanism, etc.).

Turning to the figures, FIG. 1A illustrates an example environment 100 configured to determine selectable parking positions 125 based on various inputs. The environment 100 may be arranged according to one or more embodiments of the present disclosure. In the illustrated example of FIG. 1, the environment 100 may include a parking module 120 configured to determine the selectable parking positions 125 based on various inputs, including, for example, constraints 105, mobile machine parameters 110a, and factors 112a. Other inputs may be used in addition to or alternatively to the constraints 105, the mobile machine parameters 110a, and the factors 112a without limitation.

As indicated above, one type of input used to determine the selectable parking positions 125 may include the constraints 105. The constraints 105 may include, for example, a parking area constraint, a time constraint, or any other suitable constraint used to determine the selectable parking positions 125.

In some embodiments, the parking area constraint may define a parking area within which a mobile machine may park. For example, the parking area constraint may include metes and bounds of the parking area defining a spatial region available for parking the mobile machine and may include individual parking positions. For instance, metes and bounds may include or may be based relative to GPS coordinates, streets, a surface area amount, setback regulations, construction sites, property lines, townships, subdivisions, sidewalks, berms, natural monuments, landscaping, etc. Additionally or alternatively, the parking area constraint may be spatially defined by visual designations of the parking area and/or parking positions such as lines, patterns, symbols, text, colors, signs, lights, textured surfaces, traffic directors, etc. For example, painted lines of a parking stall, flashing signals, text on street signs, parking symbols, parking cone patterns, brick-laid surfaces, hand-waving of a police officer, construction flags/cones, etc. may each visually indicate the parking area and/or parking positions within the parking area.

In some embodiments, the parking area constraint may include non-visual designations of the parking area/parking position that may be sensed or determined, such as radio frequencies, infrared light, UV light, sounds, vibrations, magnetic waves, static electricity, temperatures, altitudes, air density, air quality, etc. For example, the mobile machine may park, for example, where: a band of radio frequencies is within a particular range, air density is below a threshold amount, air pollutants are below a threshold amount, parking "chirps" are above a threshold decibel level, ambient air temperature is within a certain temperature range, charging apparatuses are available, etc.

Additionally or alternatively, the parking area constraint may include areas that affirmatively prohibit parking of the mobile machine. Examples of affirmative prohibitions to parking of the mobile machine may include any of the metes and bounds, visual designations, and non-visual designations described above. In some embodiments, the affirmative prohibitions to parking of the mobile machine may include city ordinances, county regulations, state law, federal law, etc. that do not delineate at the prohibited parking site the extent of the prohibited parking area. In these or other embodiments, the affirmative prohibitions may be communicated to the mobile machine or otherwise accessed by the mobile machine, for example, accessing the affirmative prohibitions as found online or in a parking information database.

In some embodiments, multiple individual parking positions may exist within the parking area. In such instances, the parking area constraint may include any of the metes and bounds, visual designations, and non-visual designations described above to define the individual parking positions within the parking area. In these or other embodiments, multiple mobile machines may park in respective individual parking positions within the parking area. In some embodiments, the individual parking positions within the parking area may be arranged to increase a number of mobile machines able to park in the parking area. Additionally or alternatively, the individual parking positions within the parking area may be arranged in relation to the metes and bounds of the parking area. For example, the individual parking positions may be laterally arranged next to each other (e.g., horizontal or side-by-side), stacked (e.g., vertically or on top of other mobile machines), or arranged in some combination (e.g., vertical and horizontal staggering, such as that found in parking garages). In these or other embodiments, the parking area constraint may define the spatial arrangement and/or positioning of the individual parking positions within the parking area.

In addition to the parking area constraint, the constraints 105 introduced above may also include the time constraint used to determine the selectable parking positions 125. The time constraint may define a time period that the mobile machine may be designated or permitted to park in the parking area. Examples of time constraints may include permissible parking times or days in the parking area, a maximum duration of parking in the parking area, maintenance times (e.g., street-cleaning times, garbage pick-up times, delivery times, etc.), and construction.

In some embodiments, the time constraint may include visual designations of the time period corresponding to the parking area/parking position such as lines, patterns, symbols, text, numbers, colors, signs, lights, textured surfaces, entry tickets, sun positioning, etc. For example, painted text or numbers in a parking stall, flashing signals, text or numbers on street signs/meters, clock symbols, parking stall patterns (e.g., different patterns for different time periods), brick-laid surfaces for one time period and concrete surfaces for a different time period, time-punched entry tickets, certain positioning of the sun in the sky, etc. may each visually indicate the time period.

In some embodiments, the time constraint may include non-visual designations of the time period that may be sensed or determined, such as radio frequencies, infrared light, UV light, sounds, vibrations, magnetic waves, static electricity, temperatures, altitudes, air pressure, air quality, etc. For example, the mobile machine may sense or determine that the time period has begun and/or lapsed, for example, when: a band of radio frequencies is within a particular range, atmospheric pressure is below a threshold amount, air pollutants are below a threshold amount, parking "chirps" are above a threshold decibel level, ambient air temperature is within a certain temperature range, charging apparatuses are available, etc.

Additionally or alternatively, the time constraint may include time periods that affirmatively prohibit parking of the mobile machine. Examples of affirmative time period prohibitions to parking of the mobile machine may include any of the visual designations and non-visual designations described above. In some embodiments, the affirmative time period prohibitions to parking of the mobile machine may include city ordinances, county regulations, state law, federal law, etc. that do not delineate at the prohibited parking site the extent of the prohibited time period for parking the mobile machine. In these or other embodiments, the affirmative time period prohibitions may be communicated to the mobile machine or otherwise accessed by the mobile machine, for example, accessing the affirmative time period prohibitions as found online or in a parking information database.

As indicated above, another type of input used to determine the selectable parking positions 125 may include the mobile machine parameters 110a. The mobile machine parameters 110a may include, for example, a current temperature of the mobile machine, a predicted temperature of the mobile machine, a target temperature of the mobile machine, the solar panel output of the mobile machine, a current charge level of a battery system of the mobile machine, a predicted charge level of the battery system, a charge rate of the battery system, a target charge level of the battery system, or any other suitable parameter used to determine the selectable parking positions 125.

In some embodiments, the current temperature of the mobile machine may correspond to one or both of a current component temperature of a component of the mobile machine and a current ambient air temperature of an interior of the mobile machine. For example, the current component temperature may be a real-time temperature that corresponds to one or more components of the mobile machine. The components of the mobile machine may be inside the mobile machine (e.g., the interior of the mobile machine) or outside the mobile machine (e.g., an exterior of the mobile machine). The interior of the mobile machine may include any portion of the mobile machine within an exterior of the mobile machine.

In some embodiments, the predicted temperature of the mobile machine may correspond to one or both of a predicted component temperature of a component of the mobile machine and a predicted ambient air temperature of an interior of the mobile machine. For example, the predicted component temperature may include a forecasted temperature, a typical temperature, or a historical temperature that corresponds to one or more components of the mobile machine.

In some embodiments, the target temperature of the mobile machine may correspond to one and both of a target component temperature of a component of the mobile machine or a target ambient air temperature of an interior of the mobile machine. For example, the target component temperature may be a temperature setting, a temperature goal, or a desired temperature that corresponds to one or more components of the mobile machine. In these or other embodiments, the current component temperature, the predicted component temperature, and the target component temperature may include or be represented by any of a temperature range, an estimated temperature, a minimum temperature, a maximum temperature, a change in temperature, etc.

In some embodiments, the solar panel output of the mobile machine may correspond to an electrical output (e.g., an amount of electricity) produced from converting solar energy irradiating on a solar panel of the mobile machine. The amount of electricity may be represented in various ways, including power (e.g., watts), current (e.g., amperage), voltage (e.g., volts), etc. Additionally or alternatively, the solar panel output may be associated with an efficiency, such as a solar-to-electricity conversion efficiency that may serve as a metric of how efficient electricity is produced from the solar energy irradiating the solar panel of the mobile machine (e.g., 75% of the solar energy irradiating the solar panel is converted to electricity equals a 75% solar-to-electricity conversion efficiency).

In some embodiments, the current charge level of the battery system of the mobile machine may correspond to a current charge level of one or more batteries in the battery system. For example, the current charge level of the battery system may be a summation of the current charge of each of the one or more batteries in the battery system. The summation may correspond to a manner in which the one or more batteries of the battery system are electrically connected to each other (e.g., connected in parallel, connected in series, or some combination). In these or other embodiments, the current charge level of the one or more batteries in the battery system may correspond to a state of charge (SoC) defined as a ratio of residual charge in the one or more batteries to a charge capacity of the one or more batteries (e.g., SoC=residual charge/charge capacity). The SoC for the one or more batteries in the battery system of the mobile machine may be measured using chemical operations, voltage operations, current integration operations, Maxim integrated operations, Kalman filtering operations, and/or pressure operations.

In some embodiments, the predicted charge level of the battery system of the mobile machine may correspond to a predicted charge level of one or more batteries in the battery system. For example, the predicted charge level of the battery system may be a forecasted charge level, a typical charge level, a historical charge level, etc. that corresponds to one or more batteries of the battery system. In these or other embodiments, the predicted charge level of the battery system may be related to the solar panel output. For example, as the solar panel output increases, the charge level of the battery system may be predicted to increase (e.g., to a first charge level). Additionally or alternatively, as the solar panel output decreases, the charge level of the battery system may be predicted to increase, but to a lower charge level than the first charge level (e.g., a second charge level lower than the first charge level).

In some embodiments, the target charge level of the battery system of the mobile machine may correspond to a target charge level of one or more batteries in the battery system. For example, the target charge level of the battery system may be a charge level setting, a charge level goal, or a desired charge level that corresponds to one or more batteries of the battery system. In these or other embodiments, the current charge level, the predicted charge level, and the target charge level may include or be represented by any of a range of charges, an estimated charge level, a minimum charge level, a maximum charge level, a change in charge level, etc.

In some embodiments, the charge rate of the battery system of the mobile machine may correspond to a charge rate of one or more batteries in the battery system. For example, the charge rate may correspond to how fast the one or more batteries can charge, do charge, or have charged to the charge capacity of the one or more batteries. In these or other embodiments, the charge rate of the one or more batteries may include or may be based on a C-rate. The C-rate may be a measure of the rate at which the one or more batteries is discharged. The C-rate may be defined as the discharge current divided by the theoretical current draw under which the battery would deliver its nominal rated capacity in one hour. In these or other embodiments, the solar panel output may correspond to the charge rate of the one or more batteries in the battery system. For example, as the solar panel output increases, the charge rate of the battery system may increase. Additionally or alternatively, as the solar panel output decreases, the charge rate of the battery system may decrease.

In some embodiments, one or more factors such as the factors 112a may affect the mobile machine parameters 110a and the mobile machine parameters 110b. For example, the factors 112a may include one or more of: a time of day of the time period, a time of year of the time period, current weather conditions of the parking area during the time period, a distance from a first target location to the parking area, and a distance from the parking area to a second target location, energy costs to move to or between various positions, and so on.

In some embodiments, the time of day may include a particular hour and minute of the day (e.g., 10:30 AM), an hour of the day (2 PM), or a generalized time such as morning (e.g., before noon). Additionally or alternatively, the time of the day may include a position of the sun relative to some position or object (e.g., the mobile machine). In some embodiments, the time of year may include a typical calendar season (e.g., summer, fall, winter, spring), a holiday season (e.g., Christmas, New Year, Thanksgiving, Valentines, etc.), and a sport season (hockey, baseball, hunting, etc.). In these or other embodiments, the time of year may include a position of the sun relative to some position or object (e.g., the mobile machine). In one example of a factor affecting one of the mobile machine parameters 110, the winter season may result in less solar panel output compared to the solar panel output during the summer season because the days are shorter during the winter season than in the summer season. In these or other embodiments, the factors 112a may affect the constraints 105. For example, the time of year may affect the parking constraint. For instance, given a time of year as basketball season for professional basketball, a "home" game may result in unavailable parking areas and/or new parking areas near the "home" arena on the date of each "home" game. Other suitable factors of the factors 112a may affect the constraints 105 without limitation.

In some embodiments, the current weather conditions may correspond to a real-time weather occurrence, weather pattern, weather system, weather variable, weather metric, etc. For example, current weather conditions may include a low-pressure weather system (e.g., 29.5 inches of Mercury) with snow precipitation and an ambient temperature of about 24 degrees Fahrenheit.

In some embodiments, the first distance from the first target location may include a distance of travel of the mobile machine to the parking area, where the first target location may be any geographical position. For example, the first target location may be a garage, a home, a station, a hub, a work place, a travel destination, an airport, etc. Thus, in some embodiments, the first distance may include the distance the mobile machine travels from the first target location, in which the first distance may include a mile, a nautical mile, or other suitable distance measurement.

In some embodiments, the parking module 120 may obtain the various inputs described above in any manner of ways. For example, as referenced in the present disclosure, "obtain," "obtained," and "obtaining" may include accessing, receiving, acquiring, retrieving, generating, determining, identifying, or any other suitable operation to obtain the various inputs. In these or other embodiments, the parking module 120 may be located at the mobile machine (e.g., mobile machine 315 of FIG. 3), at a user device (e.g., user device 320 of FIG. 3), at a server (e.g., server 310 of FIG. 3), or at some other suitable location.

In some embodiments, the parking module 120 may obtain the parking area constraint described above, if visually designated, by using visual recognition techniques. Such visual recognition techniques may include user inputs (e.g., voice commands, tactile feedback, text messages, etc.) to the parking module 120 that indicate visual recognition by a user. Additionally or alternatively, visual recognition techniques may include sensory input. For example, sensory input received by the parking module 120 may include sensory input from any array of sensors that may be configured to visually detect such thing as lines, patterns, text, symbols, colors, signs, lights, textured surfaces, traffic directors, etc. For example, the sensory input received by the parking module 120 may include detection of painted lines of a parking stall, flashing signals, text on street signs, parking symbols, parking cone patterns, brick-laid surfaces, hand-waving of a police officer, construction flags/cones, etc. may each visually indicate the parking area/parking position. Additionally or alternatively, visual recognition techniques may include sensory input received by the parking module 120 that may include imaging/recording data. The parking module 120 may, after receiving the imaging/recording data, analyze the imaging/recording data against predetermined or known parking area constraints. In these or other embodiments, the parking module 120 may perform image recognition techniques using the imaging/recording data.

Additionally or alternatively, the parking module 120 may obtain the parking area constraint, if non-visually designated, by using other techniques that use non-visual sensory input received at the parking module 120 from any array of sensors configured to detect such things as radio frequencies, infrared light, UV light, sounds, vibrations, magnetic waves, static electricity, temperatures, altitudes, air density, air quality, etc. In some embodiments, the parking area constraint may be obtained according to the metes and bounds of the parking area. The metes and bounds of the parking area may be determined by the parking module 120 according to visual recognition techniques described above, by user inputs described above (e.g., voice command including an address), or by accessing information online that associates the parking area constraint with the parking area. Other types of parking area constraints, such as affirmative prohibitions, may be retrieved from or sent to the parking module 120 from online sources such as a government website or a parking information database. Additionally or alternatively, other types of parking area constraints may include avoiding trees which could potentially affect the mobile machine due to dripping sap or pollen, falling debris (e.g., leaves, seeds, etc.), or high concentrations of birds (and thus bird droppings), areas prone to vandalism or theft, etc.; these parking area constraints may be determined by visual mechanisms, user input, learned processes, statistics, maps, etc.

In some embodiments, the parking module 120 may obtain the time constraint described above, if visually designated, by using the visual recognition techniques described above that may include receipt of sensory input indicating detection of such things as lines, patterns, symbols, text, numbers, colors, signs, lights, textured surfaces, entry tickets, sun positioning, etc. If non-visually designated, the parking module 120 may use non-visual sensory input described above that may include receipt of sensory input indicating detection of such things as radio frequencies, infrared light, UV light, sounds, vibrations, magnetic waves, static electricity, temperatures, altitudes, air pressure, air quality, etc. Other types of time constraints, such as affirmative prohibitions, may be retrieved from or sent to the parking module 120 from online sources such as a government website or a parking information database.

In some embodiments, the parking module 120 may determine the selectable parking positions 125. The selectable parking positions 125 may include a first parking position, a second parking position, up to an $n^{th}$ parking position. Thus, in some embodiments, the selectable parking positions 125 may be a set of parking positions, for example, positioned within one or more parking areas described above. In some embodiments, the selectable parking positions 125 may be associated with an identifier configured to be indexed and stored, for example in the parking module 120.

In some embodiments, the selectable parking positions 125 may be based on the parking area constraint and the time constraint. The selectability (e.g., the value or rank as described below in conjunction with FIG. 1B) of the selectable parking positions 125 as determined by the parking module 120 may, however, be based on any of the various inputs described above, including the constraints 105, the mobile machine parameters 110, the shadow profiles 115, and the shadow-position relationships 117.

In some embodiments, the parking module 120 may obtain the mobile machine parameters 110a and 110b in any manner of ways. The mobile machine parameters 110b may include any of the mobile machine parameters 110a, but may also include any suitable mobile machine parameters that may be predicted or otherwise determined by the parking module 120. In some embodiments, the current temperature may be monitored by the parking module 120 that communicates with temperature sensors configured to measure temperature. Via communication with the temperature sensors, the parking module 120 may monitor one or both of the current component temperature of a component of the mobile machine and the current ambient air temperature of an interior of the mobile machine. For instance, the parking module 120 may monitor the current component temperature such that the current component temperature does not rise or fall beyond some threshold temperature. For example, in some instances, component failure or inefficiencies (e.g., inefficiencies that may affect the solar panel output) may occur when the current component temperature is beyond the threshold temperature.

In another example, the current temperature may be a real-time temperature that corresponds to the interior air temperature of the mobile machine. For example, the interior of the mobile machine may be the inside of a car, the inside of a drone, the inside of a robot, etc. In some embodiments, the interior air temperature of the mobile machine may affect the current component temperature and/or may affect a temperature of any cargo or occupants (e.g., people, pets, etc.). Thus, in some embodiments, the interior air temperature of the mobile machine may be monitored by the parking module 120 as a matter of safety, comfort, and sustainability (e.g., loss prevention, spoilage, freezing, overheating, etc.) of the cargo/occupants, and/or component efficiency described above. Thus, in some embodiments, the parking module 120 may cause the mobile machine to perform operations to achieve or maintain the target temperature of the mobile machine (e.g., engage some heating or cooling system) as a matter of safety, comfort, and sustainability described above.

In these or other embodiments, the parking module 120 may predict the predicted temperature of the mobile machine as a matter of safety, comfort, and sustainability described above. The predicted temperature of the mobile machine may be based on the current temperature of the mobile machine, current weather conditions (e.g. ambient temperature exterior of the mobile machine), etc. that may be measured or sensed using temperature sensors.

In some embodiments, the parking module 120 may obtain any of the current charge level of the battery system of the mobile machine, the predicted charge level of the battery system of the mobile machine, and the target charge level of the battery system of the mobile machine. For example, the parking module 120 may perform charge measurements using chemical operations, voltage operations, current integration operations, Maxim integrated operations, Kalman filtering operations, and/or pressure operations.

In some embodiments, the parking module 120 may obtain the factors 112a and the factors 112b. The factors 112b may include any of the factors 112a, but may also include any suitable factors that may be predicted or otherwise determined by the parking module 120. The factors 112*b*, like the factors 112*a*, may affect one or more of the constraints 105 and the mobile machine parameters 110*a*/110*b*. For example, predicted weather conditions of the parking area during the time period may be one of the factors 112*b*. In some embodiments, the predicted weather conditions may correspond to forecasted weather conditions, typical weather conditions, historical weather conditions, etc. In one example of a factor affecting one of the mobile machine parameters 110*b*, a predicted high pressure weather system (e.g., 30.2 inches of Mercury) with sunny skies and an ambient temperature of 95 degrees Fahrenheit may, in turn, predict that one of the one or more batteries in the battery system of the mobile machine may lose charge capacity and (overtime) functional longevity.

Another one of the factors 112*b* may include the second distance from the second target location that may include a distance of travel (or a predicted time of travel) of the mobile machine to the parking area, where the second target location may be any geographical position. For example, the second target location may be a garage, a home, a station, a hub, a work place, a travel destination, an airport, etc. Thus, in some embodiments, the first target location (described above) and the second target location may be the same geographical position (e.g., a roundtrip leaving home and arriving at home), while in other embodiments, different geographical positions (e.g., a one-way trip, leaving home and arriving at work). In these or other embodiments, the second distance may include the distance the mobile machine travels from the second target location, in which the second distance may include a mile, a nautical mile, a number of minutes, a number of hours, or other suitable distance/time measurement.

In another example of one of the factors 112*b* affecting one of the mobile machine parameters 110, the predicted charge level of the battery system may be predicted to be at a lower charge level after traveling to the parking area from the first target location than from the second target location where, for instance, the first target location is ten miles away from the parking area and the second target location is two miles away from the parking area. In a similar example, the predicted charge level of the battery system may be predicted to be at a lower charge level after traveling to the parking area from the first target location than from the second target location where, for instance, the first target location is predicted to include a longer travel time than a travel time to the second target location.

In some embodiments, the parking module 120 may determine the shadow profiles 115. In some embodiments, each shadow profile of the shadow profiles 115 may be for a respective shadow created by a respective one of one or more shade-providing objects during the time period. The shadow may be created during the time period in response to the respective one of the one or more shade-providing objects at least partially blocking the sunlight (i.e., cast a shadow) that may irradiate an area such as a parking position within the parking area. Thus, in some embodiments, the shadow that may be created within the parking area during the time period may be dependent on the presence of the sun that provides irradiating sunlight and/or dependent on weather conditions that permit sunlight from the sun to sufficiently irradiate the one or more shade-providing objects. For example, the shadow may not be created within the parking area during the time period if at nighttime after the sun has set or if the weather conditions are foggy, cloudy, stormy, or otherwise inhibitive of sunlight irradiating the one or more shade-providing objects such that a shadow is not cast upon the parking area.

In some embodiments, the one or more shade-providing objects may be any object that at least partially blocks sunlight irradiating on the object, whereby an amount of the irradiating sunlight upon the object may not pass through the object. Thus, in some embodiments, the object may be a shade-providing object if the amount of irradiating sunlight upon the object is greater than the amount of sunlight that passes through the object. In these or other embodiments, the one or more shade providing objects may include opaque objects and translucent objects but not transparent objects. Opaque objects may allow little to no light to pass through the object (e.g., a mountain, a concrete wall, a tree trunk, etc.). Opaque objects may transmit no light, and therefore may reflect, scatter, absorb, or refract all irradiant sunlight upon the object. Translucent objects may allow some but not all light to pass through the object (e.g., frosted glass, some plastics, treetops, bushes, patio screens, etc.). Translucent objects may transmit light, and therefore may reflect, scatter, absorb or refract only some of the irradiant sunlight upon the object. Transparent objects may allow all light to pass through the object (e.g., air, clear glass, pure water, some plastics, etc.). Thus, in some embodiments, examples of shade-providing objects may include buildings, bridges, billboards, signs, covered areas, trees, mountains, etc.

In some embodiments, the one or more shade-providing objects may be identified based on the parking area constraint described above. For example, given a geographic positioning (e.g., GPS coordinates) of the parking area as described in the parking area constraint, the GPS coordinates may correspond to one or more shade-providing objects in close proximity to the parking area that are configured to cast a shadow on the parking area. In another example, given a parking sign used in obtaining the parking area constraint, the parking sign may also textually ascribe an association with a nearby building configured to cast a shadow on the parking area (Parking Sign: "Parking Available at Next Right Turn for the 111 Main Street Building."). Thus, in some embodiments, the one or more shade-providing objects may be identified based on the parking area constraint.

Additionally or alternatively, other ways of identifying the one or more shade-providing objects may include sensory detection, imaging analysis, etc. to determine the presence of shade that may be evidence of the one or more shade-providing objects and/or the presence of objects that may provide shade. Identifying the one or more shade-providing objects may be performed by the mobile machine or by some other source (e.g., a server, third-party mobile machine, etc.) using sensory equipment, imaging equipment, or other suitable equipment.

In some embodiments, the parking module 120 may determine the one or more shade-providing objects described above. For example, the parking module 120 may perform any suitable operation to identify the one or more shade-providing objects, including any operation related to receiving sensory input configured to enable sensory detection, imaging analysis, etc. described below.

Sensory detection as described in the present disclosure may include any form of human or electro-mechanical technique or mechanism of sensing one or both of the shade-providing objects and the shade therefrom. As an example, sensory detection may include any operations or device, including use of any array of sensors used to detect light to help identify the one or more shade-providing objects. For example, sensory detection may include photoreceptors, photodiodes, photoresistors, etc. ("photodetectors") that convert solar energy irradiating on the photodetector into current. In the shade (e.g., shade of a shade-providing object), an amount of solar energy is less than an amount of solar energy outside of the shade. Thus, in some embodiments, the photodetector may produce a smaller amount of current from the solar energy in the shade compared to a greater amount of current when not in the shade. In this manner, photodetectors may help to determine the presence of shade that, in turn, may lead to identifying the one or more shade-providing objects.

As another example, sensory detection may include any operations or device, including use of any array of sensors used to detect sounds to help identify the one or more shade-providing objects. For example, using echolocation or sonar, sound waves emitted and/or received may help identify a location of one or more objects. The objects located via echolocation or sonar may or may not be a shade-providing object since the echolocation or sonar may not discriminate objects based on any shade-providing qualities. In these or other embodiments, sensory detection such as the detection of sound may be used in combination with other sensory detection operations used to identify the one or more shade-providing objects. For example, sensory detection may include human vision or human inputs that may help identify the one or more shade-providing objects.

In some embodiments, imaging analysis as described in the present disclosure may include any operations or device used to identify the one or more shade-providing objects using an image. The image may include a picture image captured by a device with camera capabilities or a video captured by a device with video capabilities. The image may be an online image (e.g., Google® Street View), a live image (e.g., a web-cam image), a time-lapse image, a stitched image of multiple images, or some other image file (e.g., images of file types such as .jpg, .png, .tiff, etc.) accessed, received, generated, or otherwise obtained. In these or other embodiments, the image may depict an environment that may include any number of objects (that may or may not include some shade-providing objects). As depicted in the environment, objects may include people, vehicles, equipment, personal property items (e.g., trash cans, bicycles, etc.), animals, houses, buildings, roadways, etc. To determine what objects in the environment may be a shade-providing object, an imaging analysis may be performed.

In some embodiments, the imaging analysis may include a color analysis, a pixel analysis, or other image recognition analysis. Additionally or alternatively, the imaging analysis may be performed using edge detection methods and/or neural networks. For example, the imaging analysis may be a trained analysis that has previously analyzed a known subset (e.g., a training data set) of shade-providing objects. In this manner, the imaging analysis may learn with increasing accuracy what is a shade-providing object and what is not a shade-providing object.

In some embodiments, the shadow profiles 115 may describe the respective shadows created by the one or more shade-providing objects during the time period. For example, the shadow profiles 115 may include metes and bounds of a shadow. In some embodiments, the metes and bounds of the shadow may be relative to the one or more shade-providing objects, while in other embodiments independent of the shade-providing objects. Additionally or alternatively, the metes and bounds of the shadow may be relative to a surface such as the ground, a street, a sidewalk, etc. In some embodiments, the metes and bounds of the shadow may be 2-dimensional (e.g., an arbitrary X-Y plane describing a surface area of coverage by the shadow), while in other embodiments, 3-dimensional (e.g., an arbitrary X-Y-Z plane describing a volume of coverage by the shadow).

An example of metes and bounds of a shadow in one of the shadow profiles 115 may include a rectangular shadow that shades a 200 feet by 50 feet area on a street and sidewalks. Another example of metes and bounds of a shadow in one of the shadow profiles 115 may include a wedge-shape (e.g., right triangular prism akin to some door stops) shadow that might shade a 200 feet by 50 feet rectangular area on a street and sidewalks but also shades a region above the street-sidewalk level. Thus, a volume of the shadow in the right-wedge example might be expressed as Volume=200 feet×50 feet×height of the shade-providing object/2, in which "X" is a scalar multiplier. In these or other embodiments, the surface area of coverage by the shadow and the volume of coverage by the shadow may be defined according to the shape of the shadow as projected on a surface 2-dimensionally and/or the shape of the shade-providing object.

Additionally or alternatively, a shadow profile in the shadow profiles 115 may define the metes and bounds of a respective shadow as a function of time, e.g., the time period. As time changes, the sun changes position relative to any given object, including shade-providing objects. As the sun changes position with respect to the shade-providing objects, the respective shadows may also change. The shadows may change in shape, surface area coverage, volume coverage, etc. For instance, using the above example, at time=t1, the shadow might shade a 200 feet by 50 feet rectangular area on a street and sidewalks. At time=t2 (a different time from t1), the shadow might shade a rhombus-shaped area of 250 feet by 20 feet on the street and sidewalks. In the example, the shadow changed both the shape and the surface area coverage. Additionally or alternatively, the shadow may move (e.g., translate) during the time period, such as between t1 and t2, relative to some object or geographic position. For example, movement of the shadow may be relative to any of the sun, the mobile machine, the respective shade-providing object, the parking area/parking position, and any other suitable object or geographical position that is positionally trackable or is otherwise a static constant (e.g., immovable) to allow shadow movement calculations and predictions. Thus, in some embodiments, the shadow profiles 115 may include movement of the respective shadows during the time period.

In some embodiments, the shadow profiles 115 may also describe an amount of shade coverage provided by the shadow of the one or more shade-providing objects. The amount of shade coverage at a given position from the shadow of the shade-providing object at any given time may range from zero shade coverage (e.g., 0% shade coverage) to full shade coverage (e.g., 100% shade coverage). The amount of shade coverage at the given position from the shadow of the shade-providing object may be based on the metes and bounds of the shadow and the opacity of the shade-providing object. For instance, using the above example, a given position completely within the shaded 200 feet by 50 feet area at t1 may have 100% shade coverage if the shade-providing object is opaque. Additionally or alternatively, the given position completely within the shaded 200 feet by 50 feet area at t1 may have less than 100% shade coverage if the shade-providing object is not opaque, but is translucent. In cases where the given position may have less than 100% shade coverage from a first shadow of a first shade-providing object that is translucent, a second shade-providing object having a second shadow that intersects the first shadow may be accounted in defining the shade-coverage of the given position. For example, the first shadow of itself may provide a 60% shade coverage for a given position at t1. The second shadow of itself may provide an 80% shade coverage for the given position at t1. Where the first shadow and the second shadow intersect at the given position at t1, the shade coverage provided by the respective shadows of the shade-providing objects may be summed to a shade coverage of 100%, but no more than 100%.

In these or other embodiments, the parking module 120 may perform any suitable operation to determine the shadow profiles 115, including any operation related to receiving sensory input configured to enable the sensory detection, the imaging analysis, etc. described above in conjunction with the description of the one or more shade-providing objects. Via the sensory detection, the imaging analysis, etc., the parking module 120 may generate the shadow profiles 115 using a mapping process to map the shadow corresponding to the shade-providing object. For instance, the map generated by the parking module 120 may be a mathematical mapping such as a function that defines the metes and bounds of the shadow corresponding to the shade-providing object. Additionally or alternatively, the map generated by the parking module 120 may be a geographical mapping such as a street map, a topographical map, a satellite image map, etc. that includes the metes and bounds of the shadow corresponding to the shade-providing object. In these or other embodiments, the map of the shadow corresponding to the one or more shade-providing objects may be a real-time mapping and/or a predicted mapping (e.g., a shadow profile from now at time=t1, to five hours from now at time=t2). Additionally or alternatively, the parking module 120 may determine the amount of shade coverage described above using any of the sensory detection, the imaging analysis, etc. used to identify the one or more shade-providing objects. In these or other embodiments, the parking module 120 may perform any shade coverage calculations of surface area, volume, movement, etc. that correspond to the shadow of the one or more shade-providing objects.

In some embodiments, the parking module 120 may determine the shadow-position relationships 117. The shadow-position relationships 117 may be based on the one or more shadow profiles 115 and the constraints 105, including the time constraint and the parking area constraint. In these or other embodiments, the shadow-position relationships 117 may describe one or more respective relationships between the shadow profiles 115 and the parking areas. The one or more respective relationships between the shadow profiles 115 and the parking areas may include a description of shade coverage provided by the one or more shade-providing objects to the parking areas as a function of time. For instance, using the above example including a time=t1 and a different time=t2, the shade-providing object may provide a particular amount of shade coverage over a parking position within the parking area at t1, at t2, at any time between t1 and t2, all times during t1 to t2, any time after t2, etc. Thus, using the above example, the shade-providing object may provide the parking position with 0% shade coverage at t1 and 30% shade coverage at t2.

In these or other embodiments, the shadow-position relationships 117 may include the amount of shade coverage of the parking area as defined by the parking area constraint. For example, a first parking position within the parking area as defined in the parking area constraint may have a shade coverage of 75% during a time period, a second parking position within the parking area as defined in the parking area constraint may have a shade coverage of 95% during the time period, a third parking position within the parking area as defined in the parking area constraint may have a shade coverage of 40% during the time period, and so forth. Any other parking position and/or suitable parking constraint as described above may be included in the shadow-position relationships 117.

Additionally or alternatively, the shadow-position relationships 117 may include the amount of shade coverage of the parking area/parking position as defined by the parking area constraint for a given time period defined as the time constraint. For example, a first parking position within the parking area as defined in the parking area constraint may have a shade coverage of 75% during 9 am to 5 pm, a second parking position within the parking area as defined in the parking area constraint may have a shade coverage of 95% during 9 am to 5 pm, a third parking position within the parking area as defined in the parking area constraint may have a shade coverage of 40% during 9 am to 5 pm, and so forth. Any other suitable time constraint as described above may be included in the shadow-position relationships 117.

In these or other embodiments, the parking module 120 may perform any suitable operation to determine the shadow-position relationships 117 described above. For example, the parking module 120 may analyze how the amount of shade coverage changes as a function of time for the first parking position and the second parking position. Thus, in some embodiments, the parking module 120 may determine the shadow-position relationships 117 by associating the shadow profiles 115 with particular parking positions such as the first parking position and the second parking position in the parking area. In this manner, the parking module 120 generates information based on the shadow profiles 115 that is specific to particular parking positions within the parking area such that the specific parking positions have a shadow-position relationship with the shadow created by the shade-providing object.

Figure 1B:
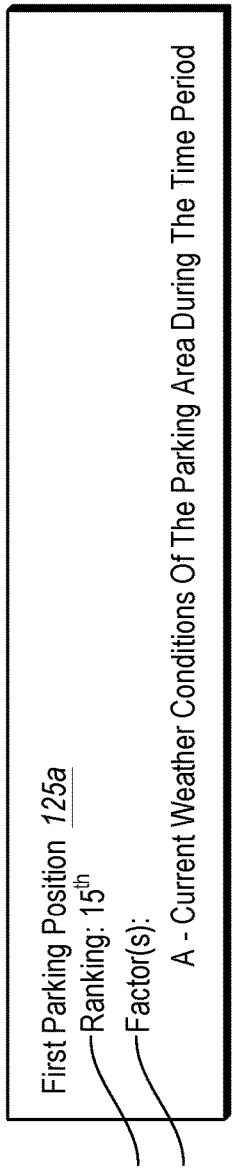
FIG. 1B illustrates some example selectable parking positions of FIG. 1A that are ranked.
Figure 1B:
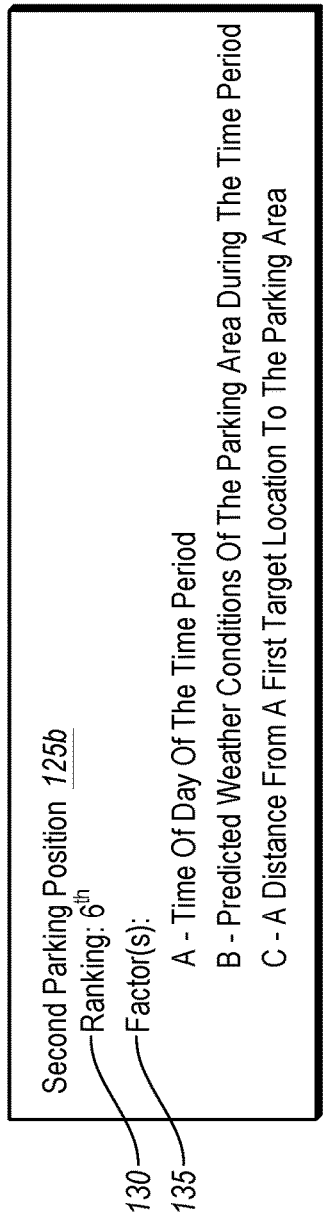
Figure 1B:
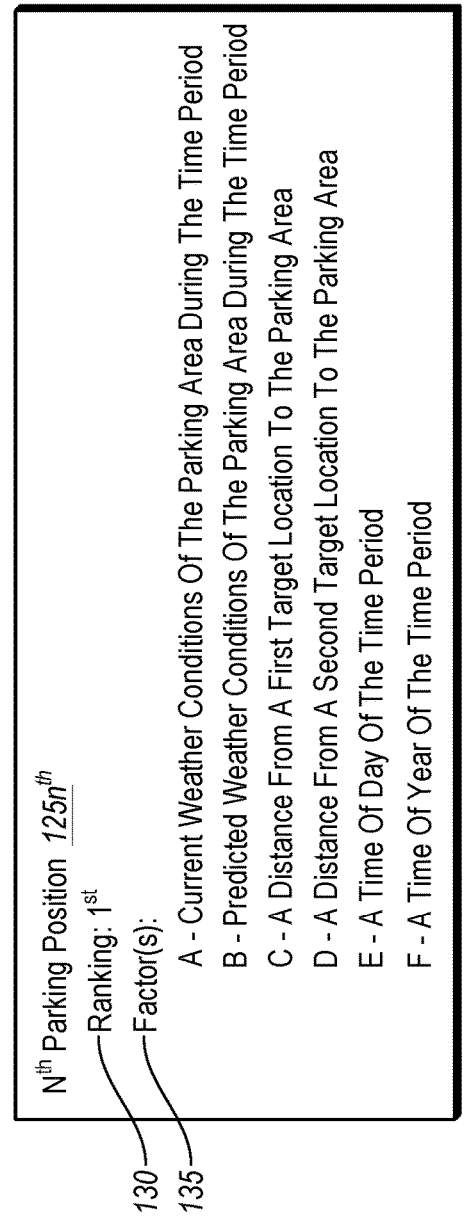

FIG. 1B illustrates some example selectable parking positions 125 of FIG. 1A that are ranked according to example factors 135 (e.g., factors 112*a*/112*b* of FIG. 1A) and/or one or more expressions. In FIG. 1B, the selectable parking positions 125 may include, for example, a first parking position 125*a*, a second parking position 125*b*, up to an $n^{th}$ parking position 125$n^{th}$. The selectable parking positions 125 and any trajectories between the selectable parking positions 125 may be ranked with a ranking 130. The ranking 130 may be based on a scoring expression. One example scoring expression is represented as follows:

if shade_desired=1, then score=$w1$*shade_coverage+$(1-w1)$*$(-1$*normalized_energy_required);

else, score=$w1$*$(1-$shade_coverage$)+(1-w1)$*$(-1$*normalized_energy_required).

In some embodiments, shade_desired may represent a binary parameter of whether shade is desired (=1) or not desired (=0) with respect to the mobile machine. For example, shade_desired may equal one (=1) if the battery system in the mobile machine has exceeded or may exceed some threshold temperature. In another example, shade_desired may equal zero (=0) if the solar panel output of solar panels on the mobile machine needs to increase.

In some embodiments, $w1$ may represent a parameter in an interval [0,1]. When the parameter $w1$=1, the mobile machine may not move from one parking position to another parking position during the time period. For example, after the mobile machine parks at the first parking position 125a, the mobile machine would not move during the time period to the second parking position 125b. Thus, in some embodiments, when the parameter w1=1, only a single parking position may be selected to park the mobile machine during the time period. However, when the parameter w1<1, multiple parking positions may be selected to park the mobile machine. For example, the mobile machine may move from one parking position to another parking position during the time period. For instance, after the mobile machine parks at the first parking position 125a, the mobile machine may move during the time period to the second parking position 125b. In such instances that the parameter w1<1, the mobile machine may move along trajectories (as defined below in conjunction with FIG. 1C) between individual parking positions of the selectable parking positions 125. In these or other embodiments, * may represent a scalar multiplier.

In some embodiments, shade_coverage may represent an amount of shade coverage between 0% and 100%, such as the shade coverage described above for the respective shadow profiles. In some embodiments, normalized_energy_required may represent an amount of energy required to perform a single movement divided by an amount of energy required to perform a set of movements. For example, a total amount of energy required to move the mobile machine from the first target location to the first parking position 125a may be X amount of energy. In the case that the mobile machine moves from the first target position to the second parking position 125b during the time period, the energy required to perform such movement may require Y amount of energy. Thus, the normalized_energy_required to move the mobile machine from the first target position to the first parking position 125a during the time period may be represented as X/(X+Y) in which (X is divided by the sum of X and Y), the representation equating to a percentage between 0% and 100%. In this manner, one move may consume more than 0% but less than 100%, two moves may consume more than one move, and so on.

In these or other embodiments, score may represent a rankable score (e.g., as ranked in the ranking 130) between negative one hundred percent to positive one hundred percent (−100% to 100%). The higher the value of score, the higher the ranking 130 may be (e.g., larger positive values may be ranked better towards top rankings). For example, as illustrated in FIG. 1B, the first parking position 125a may have a rankable score of 0.50, the second parking position 125b may have a rankable score of 0.66, and the $n^{th}$ parking position $125n^{th}$ may have a rankable score of 0.75. Thus, the ranking 130 for each of the selectable parking positions 125 may be $15^{th}$, $6^{th}$, and $1^{st}$ respectively.

In these or other embodiments, the ranking 130 may be affected by or based on one or more inputs described above in conjunction with FIG. 1A. For example, one or more of the parameters discussed above in the scoring expression for the ranking 130 may be related to or based on the mobile machine parameters 110a/110b, the factors 112a/112b (illustrated in FIG. 1B as Factor(s) 135), etc.

For instance, the current weather conditions of the parking area during the time period may be cold and snowy. In such a case, the parking module 120 may determine (e.g., via user input) that the user of the mobile machine may not wish to walk from the first parking position 125a in the cold and snowy current weather conditions. Thus, the ranking 130 of the first parking position 125a ranked $15^{th}$ may reflect a lower ranking. In comparison, the ranking 130 of the $n^{th}$ parking position $125n^{th}$ ranked $1^{st}$ may reflect a higher ranking, for example, given the cold and snowy current weather conditions that are not exposed to the $n^{th}$ parking position $125n^{th}$ located in an underground/covered parking area that the user may prefer to walk from.

In another example, the predicted weather conditions of the parking area during the time period (or some portion thereof such as a latter portion of the time period) may be hot and sunny. In such a case, the predicted temperature of the mobile machine may exceed a threshold temperature, in which the threshold temperature may be based on a component of the mobile machine and/or the user of the mobile machine. Based on the predicted weather conditions and/or the predicted temperature of the mobile machine, the ranking 130 may reflect a more desirable selectable parking position 125. For example, the second parking position 125b ranked $6^{th}$ may be exposed to the hot and sunny conditions, while the $n^{th}$ parking position $125n^{th}$ ranked $1^{st}$ may not be exposed to the same hot and sunny conditions due to being located in an underground/covered parking area that the threshold temperature may not be exceeded.

In another example, the distance from the first target location to the parking area may be reflected in the ranking 130 of the selectable parking positions 125. For example, the distance from the first target location to the second parking position 125b ranked $6^{th}$ may be a farther distance than a distance from the first target location to the $n^{th}$ parking position $125n^{th}$ ranked $1^{st}$. Thus, the greater time and energy expended by the mobile machine to travel the additional distance to the second parking position 125b in comparison to the $n^{th}$ parking position $125n^{th}$ may be reflected by the respective rankings.

In other examples, a distance from the second target location to the parking area, a time of day of the time period, and a time of year of the time period as described above in FIG. 1A (e.g., factors 112a) may also be relevant factors 135 that affect the ranking 130. In the example case of the $n^{th}$ parking position $125n^{th}$ of FIG. 1B, the distance from the second target location to the parking area, the time of day of the time period, and the time of year of the time period advantageously affected the $n^{th}$ parking position $125n^{th}$ given the ranking 130 of $1^{st}$. However, these and other suitable factors 135 not shown may also negatively affect the ranking 130 of any selectable parking position 125.

Figure 1C:
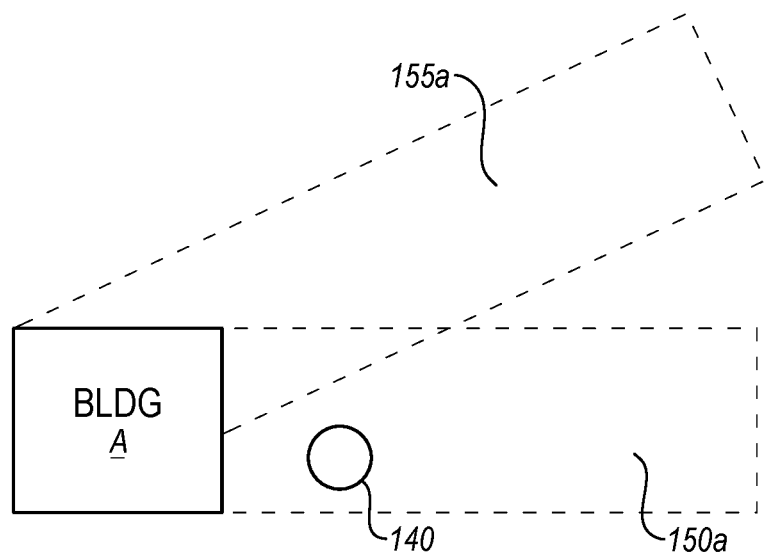
FIG. 1C illustrates an example application of selecting an example selectable parking position of any of FIGS. 1A-1B.
Figure 1C:
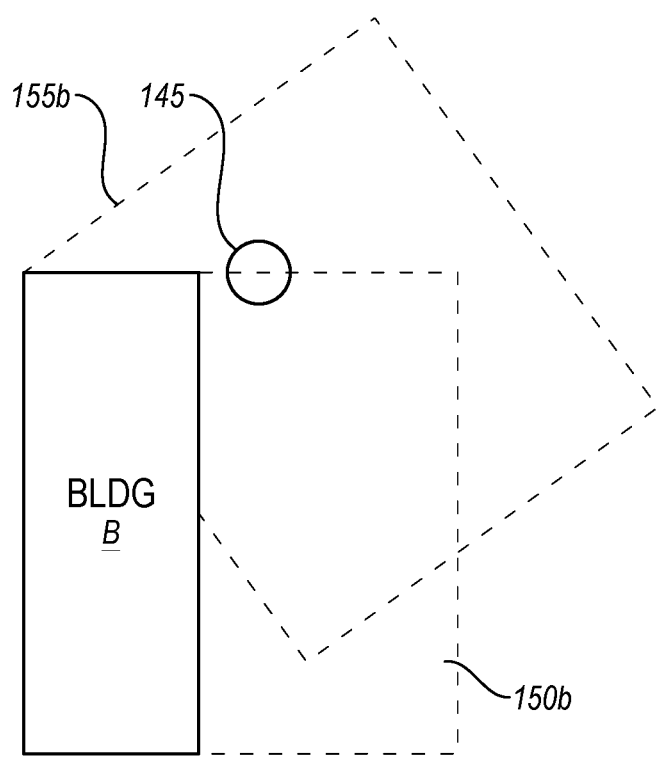

FIG. 1C illustrates an example application of selecting a parking position within any of FIGS. 1A-1B such as the selectable parking positions 125. As illustrated, FIG. 1C includes BLDG A and BLDG B, shadow profiles 150a/150b, shadow profiles 155a/155b, and a parking position 140 and a parking position 145.

In some embodiments, BLDG A and BLDG B may be examples of the one or more shade-providing objects discussed above. The shadow profile 150a and the shadow profile 155a may be example shadow profiles of the shadow profiles 115 described above. The shadow profile 150a and the shadow profile 155a may be 2-dimensional depictions of a shadow that corresponds to BLDG A. The shadow profile 150a may correspond to the shadow of BLDG A at time=t1. The shadow profile 155a may correspond to the shadow of BLDG A at time=t2, in which t2 is at a different time than t1.

The shadow profile 150b and the shadow profile 155b may be example shadow profiles of the shadow profiles 115 described above. The shadow profile 150b and the shadow profile 155b may be 2-dimensional depictions of a shadow that corresponds to BLDG B. The shadow profile 150b may correspond to the shadow of BLDG B at time=t1. The shadow profile 155*b* may correspond to the shadow of BLDG B at time=t2, in which t2 is at a different time than t1.

According to the example as illustrated in FIG. 1C, the parking position 140 may be covered 100% by the shadow profile 150*a* at t1. At t2, however, the shadow profile 155*a* may cover 0% of the parking position 140. With respect to the parking position 145, the shadow profile 150*b* may cover 50% of the parking position 145 at t1. Then, at t2, the shadow profile 155*b* may cover 100% of the parking position 145. Thus, the ranking of the parking position 140 and the parking position 145 (according to the ranking description above in conjunction with FIG. 1B) may be dependent on whether shade for the mobile machine is desired or not desired. If shade is desired, the parking position 145 may rank higher than the parking position 140 because the parking position 145 may be shaded comparatively more than the parking position 140. If shade is not desired, however, the parking position 140 may rank higher than the parking position 145 because the parking position 140 may be shaded comparatively less than the parking position 145. Thus, the parking position 140 and the parking position 145 may have a unique shadow-position relationship with the shadow created by the respective shade-providing object, which shadow-position relationship may help determine the ranking 130 of the corresponding parking position.

In some embodiments, the parking module 120 may select the parking position 140 or the parking position 145 based on one of the respective parking positions ranking higher than the other. For example, the parking module 120 may gather all scores of the respective selectable parking positions 125 (such as the parking position 140 and the parking position 145) and perform any suitable operation to filter, sort, etc. to determine the highest ranking selectable parking position 125.

After determining the highest ranking selectable parking position 125 and selecting the highest ranking selectable parking position 125, the parking module 120 may cause the mobile machine to park at, for example, the parking position 140. For instance, the parking module 120 may communicate with any electro-mechanical or other suitable system of the mobile machine that is configured to move the mobile machine to the parking position 140.

In some embodiments, the parking module 120 may determine a trajectory between any of the selectable parking positions 125, for example, between the parking position 140 and the parking position 145. The "trajectory" as described in the present disclosure may include any path along which the mobile machine may travel. In some embodiments, the parking module 120 may use any input associated with the visual recognition techniques, the non-visual recognition techniques, sensory detection operations, imaging analysis operations, etc. described above to determine the trajectory. For example, the trajectory (e.g., between the parking position 140 and the parking position 145) may be a shortest-time path, a shortest-distance path, a low-energy path, a straight path, a flight path, a street-driving path, a sidewalk path, or some other suitable path along which the mobile machine may travel.

In these or other embodiments, the trajectory, like the selectable parking positions 125, may be ranked as described above with respect to FIG. 1B. To do so, the parking module 120 may predict an amount of energy use required to move the mobile machine along a trajectory. For example, a total amount of energy required to move the mobile machine from the first target location to the parking position 140 may be X amount of energy. In the case that the mobile machine moves from the first target position to the second parking position 145 along a given trajectory during the time period, the energy required to move the mobile machine along the given trajectory may require Y amount of energy. Thus, the normalized_energy_required for the first parking position described above may be represented as X/(X+Y) in which (X is divided by the sum of X and Y) and may be a predicted value as determined by the parking module 120. In this manner, one move may consume more than 0% but less than 100%, two moves may consume more than one move, and so on.

If the predicted amount of energy required to move the mobile machine along the given trajectory is small (e.g., the normalized energy required is a low percentage such as 5%, 10% or some other suitable percentage), then the given trajectory may be ranked high and, in turn, selected by the parking module 120. Alternatively, if the predicted amount of energy required to move the mobile machine along the given trajectory is large (e.g., the normalized_energy_required is a high percentage such as 75%, 50% or some other suitable percentage), then the given trajectory may be ranked low and, in turn, affirmatively deselected or not selected by the parking module 120. In the second example of a predicted large normalized energy requirement, the energy required to move the mobile machine along the given trajectory may be more energy than could be additionally attained at the other parking position, e.g., the parking position 145. In terms of cost-benefit analysis, moving the mobile machine along the given trajectory to the parking position 145 may result in more energy loss (costs) than energy gains (benefits). However, in other example scenarios, the cost-benefit analysis may be different. For example, moving the mobile machine along the given trajectory to the parking position 145 may result in significant energy loss to the mobile machine (costs), but component failure may be prevented (benefits), which may outweigh significant energy loss. In these or other embodiments, the parking module 120 may predict the amount of energy required to move the mobile machine along the trajectory using any computational operation involving the mobile machine parameters 110*a*/110*b*, the factors 112*a*/112*b*, etc. described above.

In these or other embodiments, the parking module 120 may obtain updated mobile machine parameters 110*a*/110*b*. For example, as factors 112*a*/112*b* change, one or both of the mobile machine parameters 110*a* (current values) and mobile machine parameters 110*b* (predicted values) may change. As the parking module 120 obtains updates, such as the updated mobile machine parameters 110*a*/110*b*, the ranking 130 of respective selectable parking positions 125 and/or trajectories may, in turn, be updated.

If, after updating the rankings 130 and/or determining another higher ranking selectable parking position 125 with a suitable trajectory thereto, then the parking module 120 may cause the mobile machine to move to a different parking position, for example the parking position 145, from the parking position 140. For instance, the parking module 120 may communicate with any electro-mechanical or other suitable system of the mobile machine that is configured to move the mobile machine to the parking position 145.

Modifications, additions, or omissions may be made to the environment 100 without departing from the scope of the present disclosure. For example, the environment 100 may include other elements than those specifically listed. For instance, the number and type of inputs into the parking module 120 may vary. Additionally, the environment 100 may be included in any number of different systems or devices.

Figure 2:
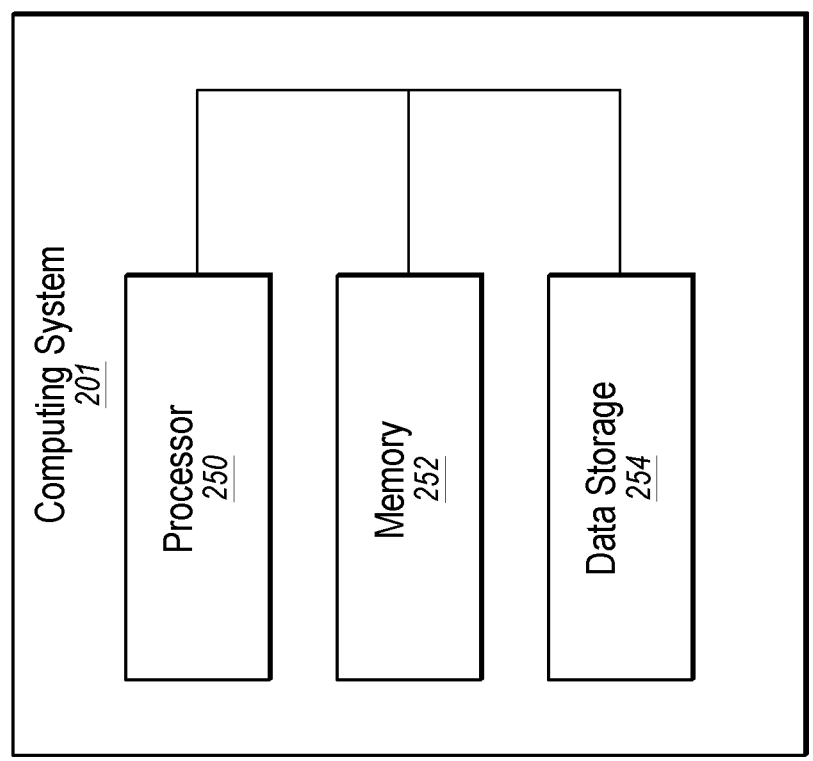
FIG. 2 illustrates a block diagram of an example computing system.

FIG. 2 illustrates a block diagram of an example computing system 201. The computing system 201 may be configured according to at least one embodiment of the present disclosure and may be configured to perform one or more operations related to generating an ASR output. The computing system 201 may include a processor 250, a memory 252, and a data storage 254. The processor 250, the memory 252, and the data storage 254 may be communicatively coupled In general, the processor 250 may include any suitable special-purpose or general-purpose computer, computing entity, or processing device including various computer hardware or software modules and may be configured to execute instructions stored on any applicable computer-readable storage media. For example, the processor 250 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 2, the processor 250 may include any number of processors configured to, individually or collectively, perform or direct performance of any number of operations described in the present disclosure. Additionally, one or more of the processors may be present on one or more different electronic devices, such as different servers.

In some embodiments, the processor 250 may be configured to interpret and/or execute program instructions and/or process data stored in the memory 252, the data storage 254, or the memory 252 and the data storage 254. In some embodiments, the processor 250 may fetch program instructions from the data storage 254 and load the program instructions in the memory 252. After the program instructions are loaded into memory 252, the processor 250 may execute the program instructions.

For example, in some embodiments, the ASR output module 102 of FIG. 1 may be included in the data storage 254 as program instructions. The processor 250 may fetch the corresponding program instructions from the data storage 254 and may load the program instructions in the memory 252. After the program instructions of the ASR output module 102 are loaded into memory 252, the processor 250 may execute the program instructions such that the computing system 204 may perform or direct the performance of the operations associated with the ASR output module 102 as directed by the instructions.

The memory 252 and the data storage 254 may include computer-readable storage media for carrying or having computer-executable instructions or data structures stored thereon. Such computer-readable storage media may include any available media that may be accessed by a general-purpose or special-purpose computer, such as the processor 250. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. In these and other embodiments, the term "non-transitory" as explained in the present disclosure should be construed to exclude only those types of transitory media that were found to fall outside the scope of patentable subject matter in the Federal Circuit decision of *In re Nuijten,* 500 F.3d 1346 (Fed. Cir. 2007). Combinations of the above may also be included within the scope of computer-readable media.

Modifications, additions, or omissions may be made to the computing system 201 without departing from the scope of the present disclosure. For example, in some embodiments, the computing system 201 may include any number of other components that may not be explicitly illustrated or described.

Figure 3:
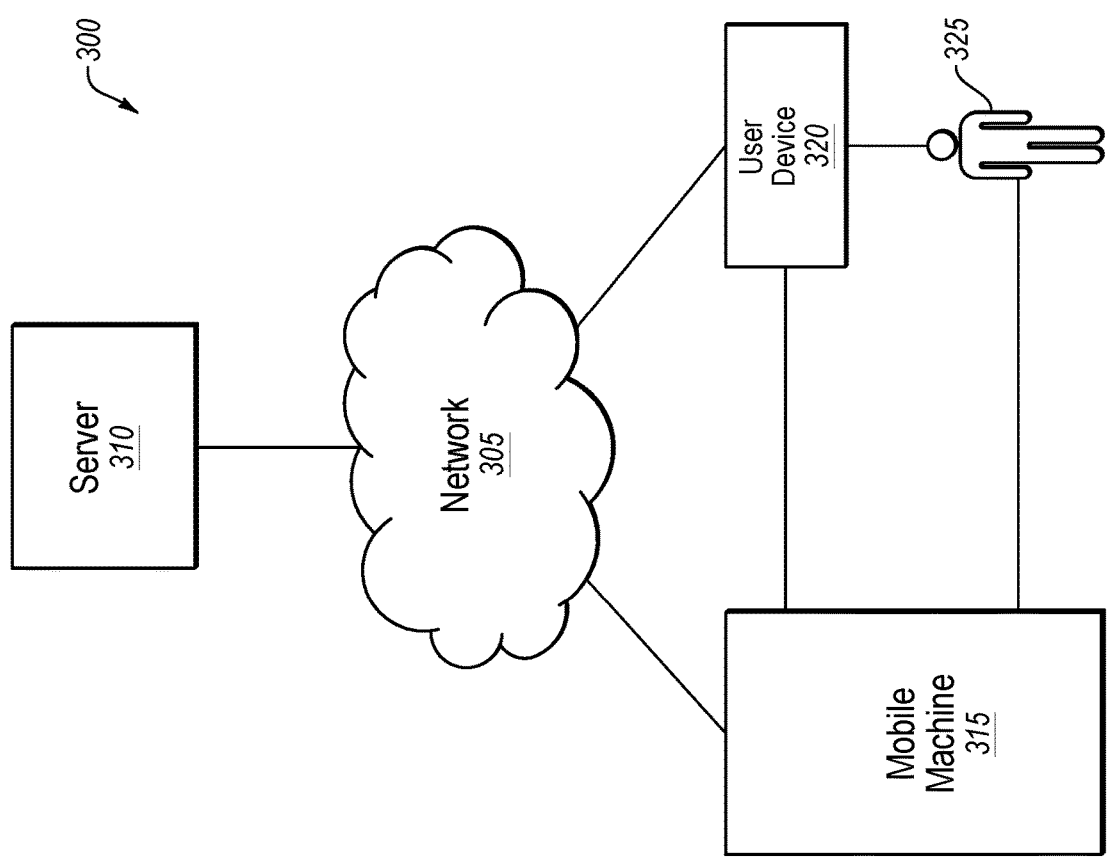
FIG. 3 illustrates an example environment configured to present communications that may include determining selectable parking positions.

FIG. 3 illustrates an example environment 300 configured to present communications that may include determining selectable parking positions (e.g., the selectable parking positions 120 of FIG. 1). The environment 300 may be arranged in accordance with at least one embodiment described in the present disclosure. The environment 300 may include a network 305, a server 310, a mobile machine 315, a user device 320, and a user 325. Modifications, additions, or omissions may be made to the environment 300 without departing from the scope of the present disclosure.

FIG. 3 may describe operation of various elements of the environment 300 in relation to each other. For example, the network 305 may provide a communication pathway between various elements of the environment 300. In this manner, the network 305 may serve as a communication bridge between one or more of: the server 310, the mobile machine 315, the user device 320, the user 325, and/or any combinations thereof. Additionally or alternatively, some communications may be direct communications without the network 305.

For example, in some embodiments, the user 325 may communicate directly with one or both of the mobile machine 315 and the user device 320 via voice commands, haptic input, etc. For instance, the user 325 may give a voice-command to the mobile machine 315 to park at a given parking position in the selectable parking positions 120. In other embodiments, the network 305 may be part of various communications as described in the present disclosure. For example, the mobile machine parameters 110*a* may be sent to the server 310 from the mobile machine 315 via the network 305. Additionally or alternatively, for instance, the selectable parking positions 120 may be determined by the parking module 120 that may be within the user device 320 that may then communicate the selectable parking positions 120 to the mobile machine 315 via the network 305. In these or other embodiments, the constraints 105, the mobile machine parameters 110*a*/110*b*, the factors 112*a*/112*b*, the shadow profiles 115, the shadow-position relationships 117, the selectable parking positions 120, etc. may each individually or in some combination be communicated over the network 305 to/from one or more elements in the environment 300, including the server 310, the mobile machine 315, and the user device 320.

In some embodiments, the network 305 may be any network or configuration of networks configured to send and receive communications between systems and devices. In some embodiments, the network 305 may include a conventional type network, a wired or wireless network, and may have numerous different configurations. Additionally or alternatively, the network 305 may include any suitable topology, configuration or configurations including a star configuration, token ring configuration, or other configurations. The network 305 may include a local area network (LAN), a wide area network (WAN) (e.g., the Internet), DECT ULE, and/or other interconnected data paths across which multiple devices may communicate. In some embodiments, the network 305 may include a peer-to-peer network. The network 305 may also be coupled to or include portions of a telecommunications network that may enable communication of data in a variety of different communication protocols. In some embodiments, the network 305 may include BlueTooth® communication networks (e.g., MESH Bluetooth) and/or cellular communication networks for sending and receiving data including via short messaging service (SMS), multimedia messaging service (MMS), hypertext transfer protocol (HTTP), direct data connection, wireless application protocol (WAP), e-mail, or the like. Further, the network 305 may include WiFi, NFC, LTE, LTE-Advanced, ZigBee®, LoRA®—a wireless technology developed to enable low data rate communications to be made over long distances by sensors and actuators for machine to machine communication and internet of things (IoT) applications—wireless USB, or any other such wireless technology.

The server 310 may include a processor-based computing device. For example, the server 310 may include a hardware server or another processor-based computing device that may function as a server. The server 310 may include memory and network communication capabilities.

The mobile machine 315 may include device or machine that is movable from a first geographic position (e.g., "Point A") to a second geographic position (e.g., "Point B"). In these or other embodiments, the mobile machine 315 may be autonomous or semi-autonomous with respect to moving between geographic positions. Alternatively, the mobile machine 315 may be human-operated between geographic positions. Examples of the mobile machine 315 may include robots, drones, self-driving cars, human-operated cars, equipment (e.g., construction/maintenance equipment such as a backhoe, a street-sweeper, a steam roller, etc.), storage pods (e.g., a transportable storage unit, etc.), or any other suitable devices configured to move between geographic positions. In some embodiments, the mobile machine 315 may include memory and at least one processor, which are configured to perform operations as described in this disclosure, among other operations. In some embodiments, the mobile machine 315 may include computer-readable instructions that are configured to be executed by the mobile machine 315 to perform operations described in this disclosure. For example, in some embodiments, the mobile machine 315 may include a computing system such as the computing system 201 of FIG. 2.

The user device 320 may include a smart phone, a cellphone, a telephone, a smart watch, a tablet, a laptop, a desktop, a smart home device, a voice-controlled device, a remote, a controller, a navigation device, a vehicle-installed device, a personal assistant device, or any other computing device. In some embodiments, the user device 320 may include memory and at least one processor, which are configured to perform operations as described in this disclosure, among other operations. In some embodiments, the user device 320 may include computer-readable instructions that are configured to be executed by the user device 320 to perform operations described in this disclosure. For example, in some embodiments, the user device 320 may include a computing system such as the computing system 201 of FIG. 2.

The user 325 may include any end users of the mobile machine 315. Example end users may include drivers, passengers, ride hailers, transportation directors/controllers, shipment personnel, inventory personnel, construction workers, etc., without limitation and including other suitable end users.

Figure 4:
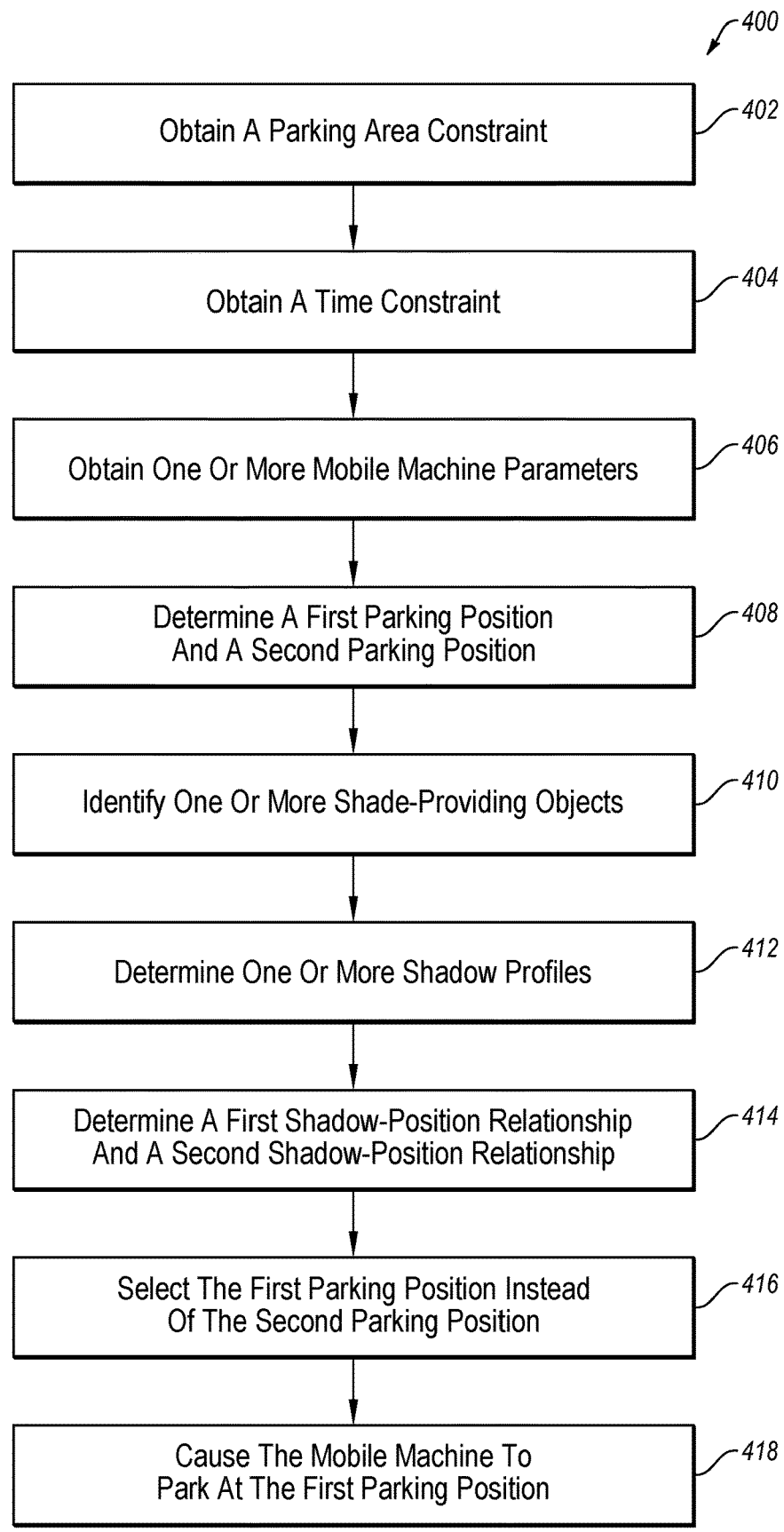
FIG. 4 is a flowchart of an example method to determine selectable parking positions based on one or more of constraints, mobile machine parameters, shadow profiles, factors, and shadow-position relationships.

FIG. 4 is a flowchart of an example method 400 to determine selectable parking positions based on one or more of constraints, mobile machine parameters, shadow profiles, factors, and shadow-position relationships. The method 400 may be arranged in accordance with at least one embodiment described in the present disclosure. The method 400 may be implemented, in some embodiments, by the parking module 120 of FIG. 1A or the system 201 of FIG. 2. In some embodiments, the method 400 may result from operations performed by a system based on instructions stored in one or more computer-readable media. Although illustrated as discrete blocks, various blocks may be divided into additional blocks, combined into fewer blocks, or eliminated, depending on the particular implementation.

The method 400 may include a block 402 where a parking area constraint may be obtained. The parking area constraint may delineate a parking area/parking position within which a mobile machine is designated to park. At block 404, a time constraint may be obtained. The time constraint may delineate a time period that the mobile machine is designated to park in the parking area/parking position. In these or other embodiments, the parking area constraint and/or the time constraint may be based on one or more of: permissible parking times or days in the parking area, maximum duration of parking in the parking area, maintenance times, and construction.

At block 406, one or more mobile machine parameters may be obtained. The one or more mobile machine parameters for the mobile machine may be affected by an amount of sunlight that irradiates the mobile machine. In some embodiments, the one or more mobile machine parameters include one or more of: a current temperature of the mobile machine, a predicted temperature of the mobile machine, a target temperature of the mobile machine, an electrical output of a solar panel system of the mobile machine, a current charge level of a battery system of the mobile machine, a predicted charge level of the battery system, a predicted charge rate of the battery system, a current charge rate of the battery system, and a target charge level of the battery system. In one or more of the blocks 402, 404, or 406, the obtaining may include accessing, receiving, acquiring, retrieving, generating, determining, identifying, or any other suitable operation to obtain the various inputs.

At block 408, a first parking position and a second parking position may be determined. The first parking position may be based on the parking area constraint and the time constraint, and may be within the parking area during the time period. The second parking position may be based on the parking area constraint and the time constraint, and may be within the parking area during the time period. At block 410, one or more shade-providing objects may be identified. The one or more shade-providing objects may provide shade within the parking area.

At block 412, one or more shadow profiles may be determined. The one or more shadow profiles may be based on the one or more shade-providing objects. In some embodiments, each shadow profile may be for a respective shadow created by a respective one of the one or more shade-providing objects during the time period. Additionally or alternatively, determining the one or more shadow profiles may include determining movement of each respective shadow during the time period.

At block 414, a first shadow-position relationship and a second shadow-position relationship may be determined. The first shadow-position relationship may be based on the time constraint, the parking area constraint, and the one or more shadow profiles. The first shadow-position relationship may indicate shade provided at the first parking position during the time period. The second shadow-position relationship may be based on the time constraint, the parking area constraint, and the one or more shadow profiles. The second shadow-position relationship may indicate shade provided at the second parking position during the time period.

At block 416, the first parking position may be selected instead of the second parking position. The selecting may be based on the first shadow-position relationship, the second shadow-position relationship, and the one or more mobile machine parameters. At block 418, the mobile machine may be caused to park at the first parking position. The mobile machine may be caused to park at the first parking position in response to the selecting of the first parking position.

Other blocks, though not necessarily illustrated, may include one or more operations. For example, operations may include determining one or more factors that affect the one or more mobile machine parameters. In some embodiments, the one or more factors may include one or more of: a time of day of the time period, a time of year of the time period, current weather conditions of the parking area during the time period, predicted weather conditions of the parking area during the time period, a distance from a first target location to the parking area, and a distance from the parking area to a second target location, energy costs to move to or between various positions, and so on. Additionally or alternatively, operations may include determining at least one of the one or more mobile machine parameters are based on the one or more factors described above.

Operations may also include one or more of: determining a trajectory between the first parking position and the second parking position, predicting an amount of energy use to move the mobile machine along the trajectory between the first parking position and the second parking position, and causing the mobile machine to move from the first parking position to the second parking position based on the predicted amount of energy use, the one or more mobile machine parameters, and the movement of one or more shadows.

Operations may also include one or more of: causing the mobile machine to move from the first parking position to the second parking position based on the one or more mobile machine parameters and the movement of one or more shadows; ranking the first parking position and the second parking position with respect to each other based on the first shadow-position relationship, the second shadow-position relationship, and the one or more mobile machine parameters; and selecting the first parking position over the second parking position based on the first parking position being ranked higher than the second parking position.

Operations may also include one or more of updating the one or more mobile machine parameters while the mobile machine is parked at the first parking position and causing the mobile machine to move to the second parking position based on the updated one or more mobile machine parameters.

Modifications, additions, or omissions may be made to method 400 without departing from the scope of the present disclosure. For example, the functions and/or operations described may be implemented in differing order than presented or one or more operations may be performed at substantially the same time. Additionally, one or more operations may be performed with respect to each of multiple virtual computing environments at the same time. Furthermore, the outlined functions and operations are only provided as examples, and some of the functions and operations may be optional, combined into fewer functions and operations, or expanded into additional functions and operations without detracting from the essence of the disclosed embodiments. For example, the selectable parking positions may be based on any number of inputs and not just the constraints, mobile machine parameters, and factors. Additionally or alternatively, the selectable parking positions may be based on any number of inputs and determinations such as the shadow profiles, shadow-position relationships, predicted mobile machine parameters, predicted factors, or any other suitable determination with respect to the selectable parking positions.

As indicated above, the embodiments described in the present disclosure may include the use of a special purpose or general purpose computer (e.g., the processor 250 of FIG. 2) including various computer hardware or software modules, as discussed in greater detail below. Further, as indicated above, embodiments described in the present disclosure may be implemented using computer-readable media (e.g., the memory 252 or data storage 254 of FIG. 2) for carrying or having computer-executable instructions or data structures stored thereon.

In some embodiments, the different components, modules, engines, and services described herein may be implemented as objects or processes that execute on a computing system. While some of the systems and methods described in the present disclosure are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used in the present disclosure to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method comprising:
   obtaining a parking area constraint that delineates a parking area within which a mobile machine is designated to park;
   obtaining a time constraint that delineates a time period that the mobile machine is designated to park in the parking area;
   obtaining one or more mobile machine parameters for the mobile machine in which the one or more mobile machine parameters are affected by an amount of sunlight that irradiates the mobile machine;
   determining, based on the parking area constraint and the time constraint, a first parking position within the parking area during the time period;
   determining, based on the parking area constraint and the time constraint, a second parking position within the parking area during the time period;
   identifying, based on the parking area constraint, one or more shade-providing objects that provide shade within the parking area;
   determining, based on the one or more shade-providing objects, one or more shadow profiles in which each shadow profile is for a respective shadow created by a respective one of the one or more shade-providing objects during the time period, wherein determining the one or more shadow profiles includes determining movement of each respective shadow during the time period;
   determining, based on the time constraint, the parking area constraint, and the one or more shadow profiles, a first shadow-position relationship that indicates shade provided at the first parking position during the time period;
   determining, based on the time constraint, the parking area constraint, and the one or more shadow profiles, a second shadow-position relationship that indicates shade provided at the second parking position during the time period;
   selecting for the mobile machine to park at the first parking position instead of the second parking position based on the first shadow-position relationship, the second shadow-position relationship, and the one or more mobile machine parameters;
   determining a trajectory between the first parking position and the second parking position;
   predicting an amount of energy use to move the mobile machine along the trajectory between the first parking position and the second parking position; and
   causing the mobile machine to move from the first parking position to the second parking position based on the predicted amount of energy use, the one or more mobile machine parameters, and the movement of one or more shadows.

2. The method of claim 1, wherein the one or more mobile machine parameters include one or more of: a current temperature of the mobile machine, a predicted temperature of the mobile machine, a target temperature of the mobile machine, an electrical output of a solar panel system of the mobile machine, a current charge level of a battery system of the mobile machine, a predicted charge level of the battery system, a predicted charge rate of the battery system, a current charge rate of the battery system, and a target charge level of the battery system.

3. The method of claim 2, further comprising:
   determining one or more factors that affect the one or more mobile machine parameters; and
   determining at least one of the one or more mobile machine parameters based on the one or more factors.

4. The method of claim 3, wherein the one or more factors include one or more of: a time of day of the time period, a time of year of the time period, current weather conditions of the parking area during the time period, predicted weather conditions of the parking area during the time period, a distance from a first target location to the parking area, a distance from the parking area to a second target location, and an energy cost to move to or from one or more of the first target location, the second target location, and the parking area.

5. The method of claim 1, further comprising causing the mobile machine to move from the first parking position to the second parking position based on the one or more mobile machine parameters and the movement of one or more shadows.

6. The method of claim 1, further comprising:
   ranking the first parking position and the second parking position with respect to each other based on the first shadow-position relationship, the second shadow-position relationship, and the one or more mobile machine parameters; and
   selecting the first parking position over the second parking position further based on the first parking position being ranked higher than the second parking position.

7. The method of claim 1, further comprising:
   updating the one or more mobile machine parameters while the mobile machine is parked at the first parking position; and
   causing the mobile machine to move to the second parking position based on the updated one or more mobile machine parameters.

8. The method of claim 1, wherein one or more of the parking area constraint and the time constraint are based on one or more of: permissible parking times or days in the parking area, maximum duration of parking in the parking area, maintenance times, and construction.

9. A non-transitory computer-readable medium having encoded therein programming code executable by one or more processors to perform or control performance of operations comprising:
   obtaining a parking area constraint that delineates a parking area within which a mobile machine is designated to park;
   obtaining a time constraint that delineates a time period that the mobile machine is designated to park in the parking area;
   obtaining one or more mobile machine parameters for the mobile machine in which the one or more mobile machine parameters are affected by an amount of sunlight that irradiates the mobile machine;
   determining, based on the parking area constraint and the time constraint, a first parking position within the parking area during the time period;
   determining, based on the parking area constraint and the time constraint, a second parking position within the parking area during the time period;
   identifying, based on the parking area constraint, one or more shade-providing objects that provide shade within the parking area;
   determining, based on the one or more shade-providing objects, one or more shadow profiles in which each shadow profile is for a respective shadow created by a respective one of the one or more shade-providing objects during the time period;
   determining, based on the time constraint, the parking area constraint, and the one or more shadow profiles, a first shadow-position relationship that indicates shade provided at the first parking position during the time period;
   determining, based on the time constraint, the parking area constraint, and the one or more shadow profiles, a second shadow-position relationship that indicates shade provided at the second parking position during the time period;
   selecting for the mobile machine to park at the first parking position instead of the second parking position based on the first shadow-position relationship, the second shadow-position relationship, and the one or more mobile machine parameters,
   wherein the one or more mobile machine parameters include one or more of: an electrical output of a solar panel system of the mobile machine, a current charge level of a battery system of the mobile machine, a predicted charge level of the battery system, a predicted charge rate of the battery system, a current charge rate of the battery system, and a target charge level of the battery system.

10. The non-transitory computer-readable medium of claim 9, the operations further comprising:
    determining one or more factors that affect the one or more mobile machine parameters; and
    determining at least one of the one or more mobile machine parameters based on the one or more factors.

11. The non-transitory computer-readable medium of claim 10, wherein the one or more factors include one or more of: a time of day of the time period, a time of year of the time period, current weather conditions of the parking area during the time period, predicted weather conditions of the parking area during the time period, a distance from a first target location to the parking area, a distance from the parking area to a second target location, and an energy cost to move to or from one or more of the first target location, the second target location, and the parking area.

12. The non-transitory computer-readable medium of claim 9, wherein determining the one or more shadow profiles includes determining movement of each respective shadow during the time period.

13. The non-transitory computer-readable medium of claim 12, the operations further comprising:
    determining a trajectory between the first parking position and the second parking position;
    predicting an amount of energy use to move the mobile machine along the trajectory between the first parking position and the second parking position; and
    causing the mobile machine to move from the first parking position to the second parking position based on the predicted amount of energy use, the one or more mobile machine parameters, and the movement of one or more shadows.

14. The non-transitory computer-readable medium of claim 12, the operations further comprising causing the mobile machine to move from the first parking position to the second parking position based on the one or more mobile machine parameters and the movement of one or more shadows.

15. The non-transitory computer-readable medium of claim 9, further comprising:
    ranking the first parking position and the second parking position with respect to each other based on the first shadow-position relationship, the second shadow-position relationship, and the one or more mobile machine parameters; and
    selecting the first parking position over the second parking position further based on the first parking position being ranked higher than the second parking position.

16. The non-transitory computer-readable medium of claim 9, further comprising:
    updating the one or more mobile machine parameters while the mobile machine is parked at the first parking position; and
    causing the mobile machine to move to the second parking position based on the updated one or more mobile machine parameters.

17. The non-transitory computer-readable medium of claim 9, wherein one or more of the parking area constraint and the time constraint are based on one or more of:

permissible parking times or days in the parking area, maximum duration of parking in the parking area, maintenance times, and construction.

\* \* \* \* \*